United States Patent [19]

Mayuzumi

[11] Patent Number: 4,483,210
[45] Date of Patent: Nov. 20, 1984

[54] MULTIPLE STAGE SPEED CHANGE GEAR DEVICE

[76] Inventor: Harutaka Mayuzumi, 370-33 Kamikashio-cho, Totauka-ku, Yokohama-shi, Kanagawa-ken, Japan

[21] Appl. No.: 334,133

[22] Filed: Dec. 24, 1981

[30] Foreign Application Priority Data

Dec. 26, 1980 [JP] Japan ................ 55-186278

[51] Int. Cl.³ .................. F16H 3/08; G05G 5/10; G05G 9/12
[52] U.S. Cl. .......................... 74/360; 74/329; 74/467; 74/473 R; 74/477; 74/745; 184/11.1
[58] Field of Search ............ 74/329, 360, 467, 473 R, 74/477, 745; 184/11 R; 474/80, 81

[56] References Cited

U.S. PATENT DOCUMENTS

| | | | |
|---|---|---|---|
| 733,193 | 7/1903 | Hain | 74/360 |
| 1,271,140 | 7/1918 | Dickey | 74/467 X |
| 1,788,899 | 1/1931 | Tenney | 74/745 X |
| 2,079,903 | 5/1937 | Eberhard | 74/473 X |
| 3,768,329 | 10/1973 | Comer, Jr. et al. | 74/477 |
| 3,808,907 | 5/1974 | Yamaguchi | 474/80 X |
| 4,271,715 | 6/1981 | Arai | 74/360 |

FOREIGN PATENT DOCUMENTS

| | | | |
|---|---|---|---|
| 2033501 | 5/1980 | United Kingdom | 74/473 R |
| 544802 | 3/1977 | U.S.S.R. | 74/467 |

Primary Examiner—Allan D. Herrmann
Attorney, Agent, or Firm—John E. Toupal; Harold G. Jarcho

[57] ABSTRACT

A multiple stage speed change gear apparatus including a control lever movable in first and second orthogonally related directions, a first mechanism for operating the shift arms of main speed change gears in response to movement of the control lever in the first direction, and a second mechanism for operating the shift arms of sub-speed change gears in response to movement of the control lever in the second direction.

16 Claims, 9 Drawing Figures

MULTIPLE STAGE SPEED CHANGE GEAR DEVICE

BACKGROUND OF THE INVENTION

This invention relates generally to a speed change gearing mechanism for motor vehicles and, more specifically, to such a mechanism for controlling both main and sub-speed change gears.

In prior art multiple stage speed change gear devices provided with both a main speed change gear and a sub-speed change gear, the gears of the main speed change gear and sub-speed change gear are respectively changed over by operating their separate and individual speed change levers. In this prior art device, a combination of gears of the main speed change gear and sub-speed change gear is selected by the two speed change levers and therefore a driver's judgement is required for a proper selection. Furthermore, it is rather cumbersome for a driver to operate the two speed change levers in a narrow driver's seat and occasionally during operation of one speed change lever the driver's hand may inadvertently touch the other speed change lever, resulting in undesired operation. Accordingly, the conventional devices pose a problem in that the time and care required for the speed change operation is greater than required by devices which use a single speed change lever.

On the other hand, there has been proposed a device in which changing over of gears of a sub-speed change gear is achieved by a fluid pressure actuator, and a fluid circuit of the fluid pressure actuator is operated by means of an electric switch mounted on an operating lever of a main speed change gear. In this device a driver may easily accomplish the speed change operation but is not always aware of the stage of speed change operation performed. This can result in a possible overrun of the engine or the like caused by improper speed change operation. In addition, operating mechanisms controlled by electrical means or fluid pressure must be provided and therefore the cost of manufacture is increased.

In order to solve these problems noted above with respect to prior art devices, it is an object of the present invention to provide a multiple stage speed change gear device in which both main and sub-speed change gears are operated by a single speed change lever.

SUMMARY OF THE INVENTION

The present invention is a multiple stage speed change gear device in which a sub-speed change gear is changed over into a low speed stage, a neutral position and a high speed stage by rocking or tilting a speed change lever in a longitudinal direction, and a main speed change gear is changed over into a backward or forward first, second and third speed stage or fourth and fifth speed stage as necessary by tilting the speed change lever stepwise in a lateral direction. Control of both main and sub-speed change gears with a single control lever greater simplifies speed change operations. In addition, the control mechanism required is relatively inexpensive.

According to one feature, the multiple stage speed change gear device includes an arrangement wherein a plurality of shift arms for changing over gears of a main speed change gear and shift arms of a sub-speed change gear are separately supported on shift rods disposed parallel to a main shaft of the main speed change gear, and shift rods for supporting the shift arms of the sub-speed change gear are connected so as to be axially moved directly by means of a speed change lever. The shift arms of the main speed change gear are connected through a lever turned by the speed change lever, a sector wheel is connected to the lever, and a plurality of gears mesh with the sector wheel and have eccentric pins in engagement with the shift block of the shift rod. This arrangement facilitates the desired single lever control.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
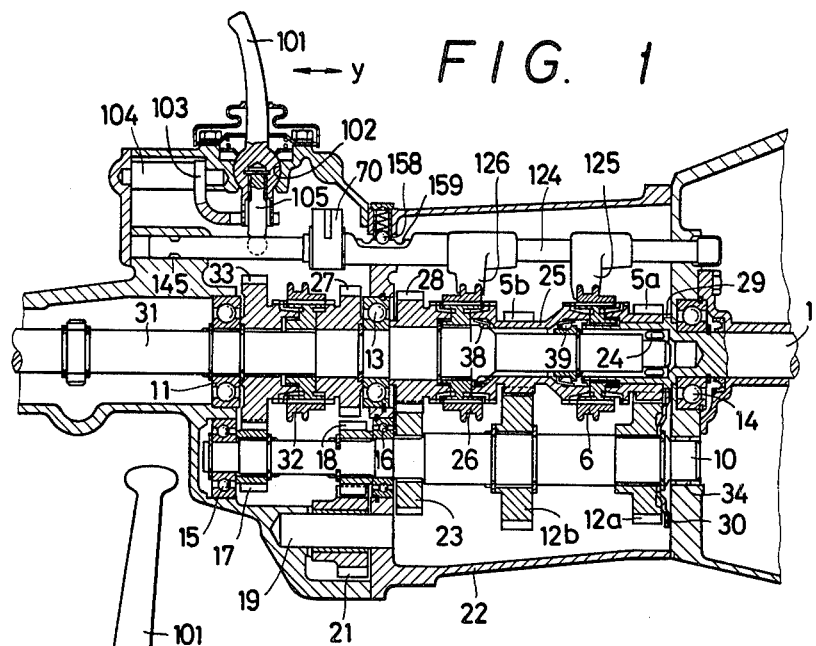
FIG. 1 is a sectional side view of a multiple stage speed change device in accordance with the present invention.

The construction of the present invention will be described with reference to a preferred embodiment. As shown in FIG. 1, an input shaft 1 is supported on a wall at the right end of a housing 22 by means of a bearing 14, and a main shaft 31 is supported in line with the input shaft by means of bearings 11 and 13. The main shaft 31 has its right end supported on a hollow portion of the input shaft 1 by means of a bearing 24. A sub-shaft 10 is supported on a housing 22 by means of bearings 15, 16 and a roller bearing 34. Integrally formed with a gear 5b and rotatably but not axially movably supported on the right end portion of the main shaft 31 by means of a pair of bearings 38 and 39 is a hollow shaft 25. A gear 5a is rotatably supported on the input shaft 1, and a gear 12a meshed therewith a gear 12b meshed with said gear 5b are respectively rotatably supported to the sub-shaft 10 to constitute a sub-speed change gear. Supported on a left end of the input shaft 1 is a synchronously meshing type clutch 6, and when the clutch is moved rightward, the gear 5a is rotatably coupled to the input shaft rightward while when it is moved leftward, the hollow shaft 25 having the gear 5b is rotatably coupled to the input shaft 1.

Gears 33, 27 and 28 are rotatable supported on the main shaft 31, and a gear 17 is meshed with the gear 33, a gear 23 meshed with the gear 28, and a gear 18 meshed with the gear 27 through a gear 21 are rotatably supported by the sub-shaft 10 to constitute a main speed change gear. While the gear 21 is supported on the housing 22 by means of a shaft 19, it is actually arranged so as to mesh with both the gear 27 and gear 18. A clutch 32 is arranged between the gear 33 and the gear 27 and a clutch 26 is arranged between the gear 28 and the hollow shaft 25, which are coupled to the main shaft 31 by a spline and axially movable to thereby rotatably couple one of the adjacent gears to the main shaft 31. The clutch 32 has formed in its peripheral surface an annular groove, and a forked shift arm 121 (FIG. 2) which bridges thereover for engagement therewith is slidably supported on a shift rod 122 supported on the housing 22. Similarly, a shift arm 126 in engagement with the clutch 26 is slidably supported on a shift rod 124, and a shift arm 125 in engagement with the clutch 6 is fixedly supported on the shift rod 124. Three grooves 159 are provided in an intermediate portion of the shift rod 124 in axially spaced relation, and a ball 158, supported on the housing side and urged by means of a spring, engages therewith to axially move the shift rod 124 to three positions during operation of the clutch 6. A groove 145 is provided in the left end of the shift rod 124 and an interlock mechanism in engagement with the groove 145 prevents simultaneous operation of the sub-speed change gear and the main speed change gear. An intermediate spherical portion of a speed change lever 101 is engageably supported by means of a spring in a spherical seat 102 provided at an upper portion of the housing 22. The lower end of the speed change lever 101 is formed into a cylindrical and forked configuration as shown in FIG. 3, between which is connected a sub-speed shift arm rod 105 by means of a pin 109. Engaging the lower end of the rod 105 is a depression in the shift rod 124. The rod 105 can be tilted about the spherical seat 102 when the speed change lever 101 is moved in a first direction indicated by the arrow Y but cannot be tilted when the speed change lever 101 is moved in a second direction at a right angle to the arrow Y. A lever 103 formed in an L-shape and bifurcated to hold the aforesaid forked portion of the speed change lever 101 is pivotally supported on the housing by means of a pivot 104. The lever 103 is provided with an a main shift arm 111 extending sideways with respect to the pivot 104.

Figure 4:
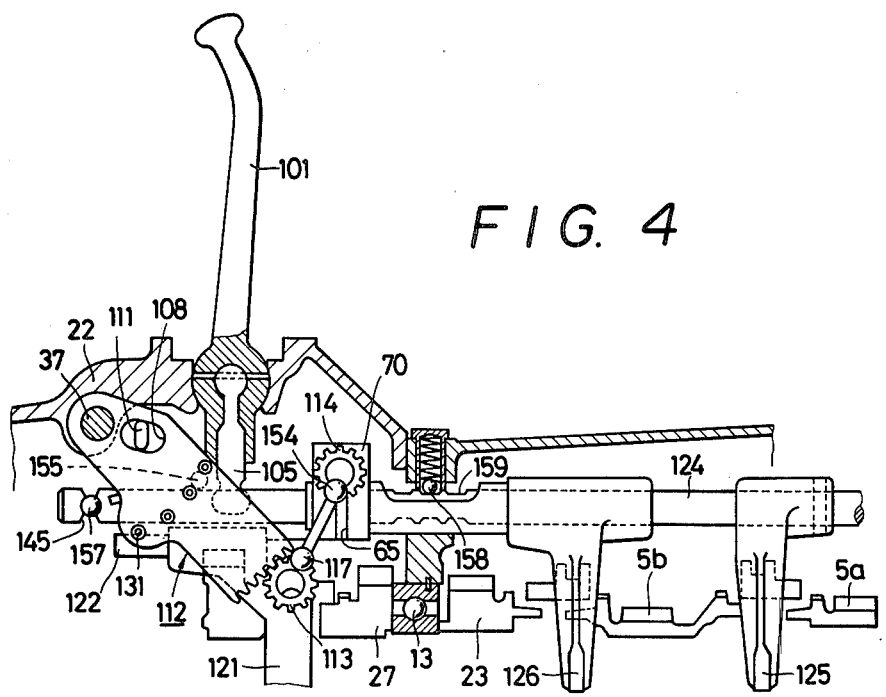
FIG. 4 is an enlarged sectional view showing a principal portion of FIG. 1.
Figure 5:
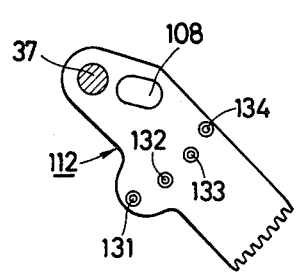
FIG. 5 is a plan view of a sector wheel shown in FIG. 4.
Figure 6:
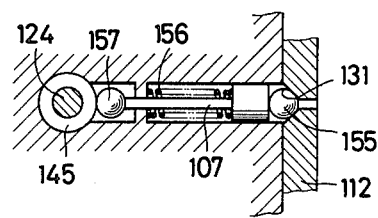
FIG. 6 is a sectional view of an interlock mechanism between the sector wheel and the shift rod shown in FIG. 4.

As shown in FIG. 4, a sector wheel 112 is supported on the housing 22 by means of a support shaft 37, and has an elliptical slot 108 that receives the aforesaid arm 111. Successively engaged by the sector wheel 112 are a gear 113 and a gear 114 both supported by the housing 22. As shown in FIG. 5, the sector wheel 112 is provided with four depressions 131–134 on a circumference about the support shaft 37 and a rod 107 (FIG. 6) is interposed between a ball 155 engageable with the depressions and a ball 157 engageable with the groove 145 formed in the left end of the shift rod 124. The rod 107 and balls 155, 157 consititute an interlock mechanism so that the shift rod 124 and the sector wheel 112 can be operated simultaneously. That is, the rod 107 is slidably fitted on the housing 22 and urged in abutment with the ball 155 by means of a spring 156, whereby only when the ball 157 is engaged with the groove 145 of the shift rod 124 can the ball 155 slip out of the depressions 131–134 to allow rotation of the sector wheel 112.

Figure 7:
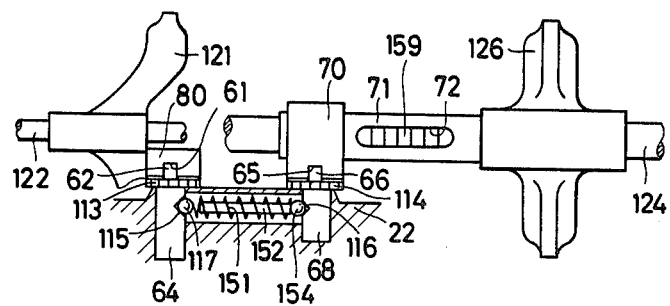
FIG. 7 is a partially cutaway plan view showing the relation between a gear driven by the sector wheel and the shift lever.

As shown in FIG. 7, the gear 113 is supported from the housing 22 by a shaft 64. A pin 62 extends from one side of the gear 113 eccentrically with respect to the shaft 64. Engaging the pin 62 is a groove 61 in a member 80 coupled to the shift arm 121. The groove 61 extends vertically in a direction at a right angle to the axial direction of the shift rod 122. Similarly, the gear 114 is supported from the housing 22 by a shaft 68 and a pin 66 extending eccentrically from one side of the gear 114 is engaged with the groove 65 of a member 70. The engageable member 70 is coupled to the shift arm 126 through a connecting cylinder 71, which is in turn slidably supported over the shift rod 124. Engaging the ball 158 (FIG. 1) is the groove 159 of the shift rod 124 through a shift 72 formed in the connecting cylinder 71. An interlock mechanism is provided between the shaft 64 of the gear 113 and the shaft 68 of the gear 114 so as to prevent simultaneous rotation thereof. That is, the shafts 64 and 68 are respectively formed with depressions 115 and 116 in their outer peripheral surfaces, and a rod 152 is interposed between balls 117 and 154 that engage the grooves 115 and 116. A spring 151 urges engagement of the balls and only when one of the balls is engaged with a groove in one shaft to restrain rotation thereof, can the other shaft be rotated freely.

As further shown in FIG. 1, the input shaft 1 is integrally formed with a gear 29 adjacent to the bearing 14 while a gear 30 formed from a thin plate is meshed with the gear 29 and is rotatably supported on the sub-shaft 10. Because of the gear 29, the gear 30 rotates even when the sub-shaft 10 is in a neutral state and not rotating. Thus, lubricating oil at the bottom of the housing 22 is at all times lifted by the gear 30 to lubricate the bearing 14 which supports the input shaft 1.

OPERATIONS

Next, the operation of the multiple stage speed change gear device in accordance with the present invention will be described. The mode of meshing of gears of the main speed change gear is changed by rocking the speed change lever 101 about the spherical seat 102 in a lateral direction; i.e., at a right angle to the arrow Y. Conversely, the mode of meshing of gears of the sub-speed change gear is changed by rocking the speed change lever 101 in a longitudinal direction indicated by the arrow Y. In the neutral condition shown in FIG. 1, the ball 158 is engaged with the groove 159 in the central portion of the shift rod 124, and at this time, the ball 157 is within the groove 145. In this neutral condition, the speed change lever 101 can be rocked only in the lateral direction. The input shaft 1 is integrally coupled to the engine through a clutch (not shown) and the speed change operation is affected after the clutch has been disengaged.

Figure 2:
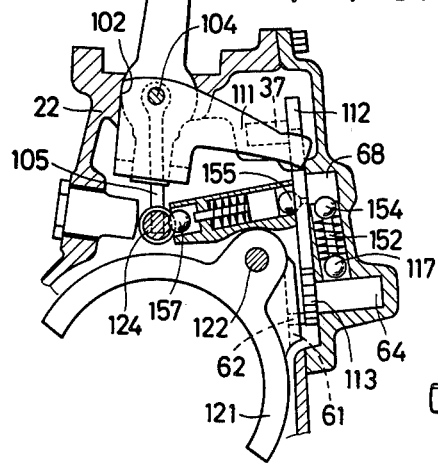
FIG. 2 is a sectional front view of the device in an enlarged scale.
Figure 3:
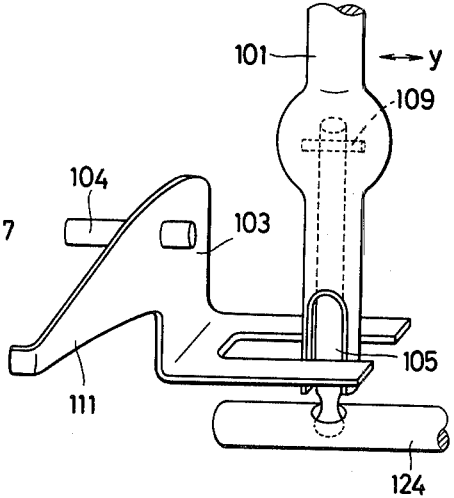
FIG. 3 is a perspective view showing a speed change lever in engagement with a shift rod.
Figure 8:
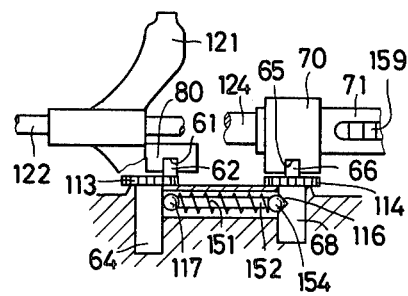
FIGS. 8 and 9 are plan views showing the operating conditions of the backward stage and first speed stage of the main speed change gear.

In the event that the speed change lever 101 is to move the position of the main speed change gear into the backward mode, the speed change lever 101 is depressed rightward in FIG. 2 rotating the arm 111 clockwise about the support shaft 104 and the sector wheel 112 clockwise (FIG. 4) about the support shaft 37. Accordingly, the gear 113 is rotated counterclockwise, the pin 62 positioned below the gear 113 is rotated 90° and displaced to the right as shown in FIG. 8, the shift arm 121 engages the pin 62 as the groove 61 is moved rightward, and the gear 27 is integrally coupled to the main shaft 31 by means of the clutch 32. At this time, as shown in FIG. 8, the ball 117 has slipped out of the depression 115 in the shaft 64 of the gear 113 and the ball 154 has fallen into the depression 116 in the shaft 68 of the gear 114 to restrict rotation thereof. Also, the ball 155 has fallen into the depression 134 of the sector wheel 112. Accordingly, in this condition, the ball 157 can be forced out of the groove 145 to move the shift rod 124 in an axial direction.

If, in that condition, the speed change lever 101 is depressed rightward in FIG. 1, the shift rod 124 is moved leftward and the ball 158 falls into the right-hand groove 159. At this time, the clutch 6 is urged leftward by means of the shift arm 125 and the input shaft 1 is integrally coupled to the hollow shaft 25. Thus, the rotation of the input shaft 1 is transmitted to the main shaft 31 through the gears 5b, 12b, of the hollow shaft 25, the sub-shaft 10 and the gears 18, 21, and 27, whereby the sub-speed change gear is connected to the lower speed stage and the main speed change gear is connected to the backward stage. Conversely, if the speed change lever 101 is depressed leftward, the shift arm 125 is moved rightward along with the shift rod 124, and the input shaft 1 is integrally coupled to the gear 5a. Thus, the rotation of the input shaft 1 is transmitted to the main shaft 31 through the gears 5a, 12a, the sub-shaft 10 and the gears 18, 21 and 27, whereby the main speed change gear is connected to the backward stage and the sub-speed change gear connected to the high speed stage.

Figure 9:
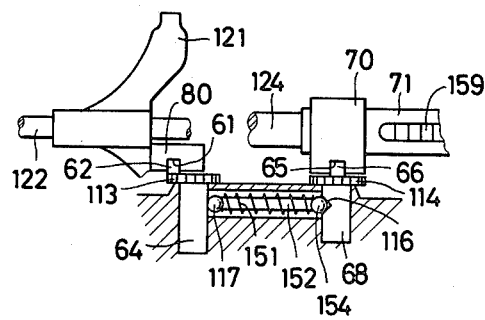

In the event that the main speed change gear is to be changed over into the forward first stage and the sub-speed change gear is to be changed over into the low speed stage, the speed change lever 101 is returned to the neutral position; i.e., the condition where the ball 158 is engaged with the groove 159 in the central portion of the shift rod 124. Then the speed change lever 101 is depressed leftward (FIG. 2) rotating the arm 111 counterclockwise about the support shaft 104 and the sector wheel 112 counterclockwise about the support shaft 37 (FIG. 4) until the ball 155 falls into the depression 133 (FIG. 5). At this time, the gear 113 is rotated 90° clockwise until the pin 62 assumes the left position as shown in FIG. 9. Accordingly, the shift arm 121 which is in engagement with the pin 62 at the groove 61 is moved leftward with the shift rod 122 and the gear 33 is integrally coupled to the main shaft 31 by means of the clutch 32.

If, in that condition, the speed change lever 101 is depressed rightward (FIG. 1), the shift arm 125 moves leftward along with the shift rod 124 and the input shaft 1 is integrally coupled to the hollow shaft 25 by means of the clutch 6. Thus, in this condition, the rotation of the input shaft 1 is transmitted to the main shaft 31 through the gear 5b of the hollow shaft 25, the gear 12b, the sub-shaft 10 and the gears 17, 33. Conversely, if the speed change lever 101 is depressed leftward, the clutch 6 moves rightward by means of the shift rod 124 with the result that the gear 5a is coupled to the input shaft 1, whereby the sub-speed change gear is changed into the high speed stage.

In the event that the main speed change gear is to be changed into the second speed stage, the longitudinal inclination of the speed change lever 101 is returned to the neutral position and then further depressed leftward (FIG. 2). Then the sector wheel 112 is rotated counterclockwise about the support shaft 37 by means of the arm 111, and the ball 155 falls into the depression 132. At this time, the sector wheel 112 remains meshed with the gear 113 because of the condition shown in FIG. 9 which produces further rotation through 90° clockwise. When the pin 62 moves upward, the sector wheel 112 is disengaged from the gear 113 and meshes with the gear 114. In this condition, the clutch 32 is returned to its neutral position. At the same time, the ball 117 has fallen into the depression 115 in the shaft 64 of the gear 113 to render the shaft 68 of the gear 114 rotatable. Then the gear 114 is rotated 90° clockwise by means of the sector wheel 112, and the pin 66 positioned below is displaced leftward. Accordingly, the member 70 engages the pin 66 at the groove 65, the connecting cylinder 71 and the shift arm 126 are moved leftward along with the shift rod 124, and the gear 28 is integrally coupled to the main shaft 31 by means of the clutch 26.

If, with that condition, the speed change lever 101 is depressed rightward (FIG. 1), the shift arm 125 moves leftward along with the shift rod 124, and the hollow shaft 25 is integrally coupled to the input shaft 1 by means of the clutch 6. Thus, the rotation of the input shaft 1 is transmitted to the main shaft 31 through the hollow shaft 25, the gears 5b, 12b, the sub-shaft 10, and the gears 23, 28. Conversely, if the speed change lever 101 is depressed leftward, the main speed change gear may assume the mode of meshing of gears in the second speed stage whereas the sub-speed change gear assumes that in the high speed stage.

In the event that the main speed change gear is to be switched to the third speed stage, the lateral inclination of the speed change lever 101 is returned to the neutral position causing the sub-speed change gear to assume the neutral position. Thereafter, if the lever 101 is further depressed leftward (FIG. 2), the sector wheel 112 is rotated counterclockwise by means of the arm 111 and the ball 155 falls into the depression 131. The gear 114 is rotated clockwise by means of the sector wheel 112, and when the gear is rotated 90° from the condition of the second speed stage. That displaces the pin 66 upwardly to return the clutch 26 to the neutral position, after which the gear is further rotated 90° and the pin 66 is displaced rightward with the result that the engageable member 70 engages the groove 65, the shift arm 126 is moved rightward and the main shaft 31 is integrally coupled to the hollow shaft 25 by means of the clutch 26.

If, in that condition, the speed change lever 101 is depressed rightward (FIG. 1), the shift rod 124 and the shift arm 125 are moved leftward and the input shaft 1 is rotatably coupled to the hollow shaft 25 by means of the clutch 6. Thus, the rotation of the input shaft 1 is transmitted to the main shaft 31 through the hollow shaft 25. Conversely, if the speed change lever 101 is depressed leftward, the sub-speed change gear is changed into the high speed stage, and the rotation of the input shaft 1 is transmitted to the main shaft 31 through the gears 5a, 12a, the sub-shaft 10, the gears 12b, 5b and the hollow shaft 25.

In the event that the main speed change gear is to be changed from third speed to low speed stage, the longitudinal inclination of the speed change lever 101 must be returned to the neutral position so that the ball 157 is engaged with the groove 145. Then, if the speed change lever 101 is depressed stepwise rightward (FIG. 2), the sector wheel 112 is rotated clockwise about the support shaft 37 with the result that the ball 155 is successively engaged with the depressions 131, 132 and 133. During that movement, the gear 114 is rotated 270° counterclockwise (FIG. 4) returning the pin 66 to the neutral position. Thereafter the gear 113 is rotated 90° counterclockwise and the main speed change gear is then meshed with the first speed stage gear.

As described above, the present invention is characterized in that the arm 111 of the rotatable lever 103 is engaged to the sector wheel 112 by pivoting the speed change lever 101 in a lateral direction, the sector wheel 112 is rotated stepwise about the axis perpendicular to the shift rod to thereby successively engage the first and second gears, and the pins 62 and 66 are eccentrically mounted respectively on each of the gears 113 and 114 and engage the grooves 61 and 65 of the shift arms to actuate the first and second clutches which select meshing of the gears of the main speed change gear. With this arrangement, there offers the following effects:

1. Shifting gears of the sub-speed change gear may be affected by pivoting the speed change lever 101 in a longitudinal direction, and meshing of gears of the main speed change gear may be shifted from the first speed to higher speed stage successively by pivoting the speed change lever stepwise in a lateral direction. 2. Since an interlock mechanism is provided between the shift rod adapted to shift the sub-speed change gear and the sector wheel adapted to shift the main speed change gear, the main speed change gear cannot be operated for speed change unless meshing of the sub-speed change gear is released to the neutral position. Therefore, the speed change operation is accomplished without interference.

3. If the synchronously meshing type clutch adapted to shift gears of the main speed change gear and sub-speed shift gear is appropriately designed, the driver can feel the operating condition of the speed change gear from the resistance received through the pivoting operation of the speed change lever, and therefore it is possible to prevent erroneous operation such as overrun of the engine.

4. Since the present device employs the construction in which the input shaft is separated from the sub-speed change gear, it will suffice that a synchronous torque is produced in the gears on the main shaft, the synchronous torque overcoming a sum of moment of inertia and moment of resistance of normally meshed gear trains including gears on the main shaft and the sub-shaft, viscosity of lubricating oil and moment of stirring resistance. Since the device is not affected by a great moment of inertia of a frictional disk of the clutch, an operating force required for speed change is small and an operating force required for the speed change lever is also small.

Obviously, many modifications and variations of the present invention are possible in light of the above teachings. It is to be understood, therefore, that the invention can be practiced otherwise than as specifically described.

What is claimed is:

1. A multiple stage speed change gear device comprising:
   an input shaft;
   a main shaft;
   a main speed change gear means providing a plurality of selectable different main gear ratios;
   a sub-speed change gear means providing selectable high and low speed gear ratios, said main speed and sub-speed change gear means being selectively engagable to rotatably couple said main shaft to said input shaft;
   a pivotable speed change lever;
   a first operating mechanism responsive to movement of said lever in a first direction to sequentially provide said different gear ratios, each at a different main position of said lever; and
   a second operating mechanism responsive to movement of said lever in orthogonally related directions from each of said main positions to sequentially provide said high and low speed gear ratios; and wherein said input shaft is disengaged from said main speed change gear means and said sub-speed change gear means with said change lever in said main positions.

2. A device according to claim 1 including a housing for said device and wherein said main speed change gear means comprises a main shift arm means actuated by movement of said lever in said first direction; and said sub-speed change gear means comprises a sub-speed shaft and a sub-speed shift arm means actuated by movement of said lever in said orthogonal directions.

3. A device according to claim 2 including a first lubricating gear on said input shaft and a second lubricating gear rotatably mounted on said sub-speed shaft and engaged with said first lubricating gear.

4. A device according to claim 2 including a shift rod supported by said housing and axially movable in response to pivotal movement of said speed change lever in said orthogonal directions; and wherein said main shift arm means comprises a main shift arm mounted for movement axially relative to said shift rod, and said sub-speed shift arm means is fixed to said shift rod.

5. A device according to claim 4 including a first lubricating gear on said input shaft and a second lubricating gear rotatably mounted on said sub-speed shaft and engaged with said first lubricating gear.

6. A device according to claim 4 wherein said main speed change gear means comprise a plurality of main gears rotatably secured on said main shaft and said sub-speed change gear means comprise a plurality of sub-speed gears on said sub-speed shaft and meshable with said main gears directly or indirectly.

7. A device according to claim 6 including a first lubricating gear on said input shaft and a second lubricating gear rotatably mounted on said sub-speed shaft and engaged with said first lubricating gear.

8. A device according to claim 6 wherein said sub-speed change gear means further comprises a clutch and an intermediate shaft rotatably supported on said main shaft; said sub-speed gears comprise a first gear rotatably secured to said input shaft, a second gear secured on said intermediate shaft, third and fourth gears secured to said sub-speed shaft and each being meshed respectively with said first and second gears, and said clutch being operated by said sub-speed shift arm to couple said input shaft with either said first gear or said intermediate shaft.

9. A device according to claim 8 including a first lubricating gear on said input shaft and a second lubricating gear rotatably mounted on said sub-speed shaft and engaged with said first lubricating gear.

10. A device according to claim 8 wherein said first operating mechanism comprises a sector wheel operable by said speed change lever, alternate gears arranged to be successively meshed with said sector wheel, and a pin eccentrically mounted on each of said alternate gears and engageable respectively by said main shift arm means and sub-speed shift arms.

11. A device according to claim 1 including a first lubricating gear on said input shaft and a second lubricating gear rotatably mounted on said sub-speed shaft and engaged with said first lubricating gear.

12. A device according to claim 1 wherein movement of said lever in one orthogonally related direction from each of said main positions provides said high speed gear ratio and movement thereof in an opposite orthogonally related direction from each of said main positions provides said low speed gear ratio.

13. A multiple stage speed change gear device comprising:
- a speed change lever pivotable in first and second orthogonally related directions;
- a main speed change gear means having a backward and a plurality of forward speed stages; said main speed change gear means comprising a main shaft, a first shift rod having a first shift arm and a second shift rod having a second shift arm;
- a sub-speed change gear means having a low speed stage, a neutral position and a high speed stage; said sub-speed change gear means comprising a hollow shaft on said main shaft and a third shift arm on said second shift rod;
- a first operating mechanism for operating said first and second shift arms in response to movement of said speed change lever in said first direction; and
- a second operating mechanism for operating said third shift arm in response to movement of said speed change lever in said second direction.

14. A multiple stage speed change gear device comprising:
- a speed change lever pivotable in first and second orthogonally related directions;
- a main speed change gear means having a backward and a plurality of forward speed stages; said main speed change gear means comprising a main shaft, a first shift rod having a first shift arm and a second shift rod having a second shift arm;
- a sub-speed change gear means having a low speed stage, a neutral position and a high speed stage; said sub-speed change gear means comprising a hollow shaft on said main shaft and a third shift arm on said second shift rod;
- a first operating mechanism for operating said first and second shift arms in response to movement of said speed change lever in said first direction; said first operating mechanism comprising a sector wheel operable by said speed change lever, alternate gears arranged to be successively meshed with said sector wheel, and a pin eccentrically mounted on each of said alternate gears and engageable respectively by said first and second shift arms; and
- a second operating mechanism for operating said third shift arm in response to movement of said speed change lever in said second direction.

15. A multiple stage speed change gear device comprising:
- a speed change lever pivotable in first and second orthogonally related directions;
- a main speed change gear means having a backward and a plurality of forward speed stages; said main speed change gear means comprising a main shaft, a first shift rod having a first shift arm and a second shift rod having a second shift arm;
- a sub-speed change gear means having a low speed stage, a neutral position and a high speed stage, said sub-speed change gear means comprising a hollow shaft on said main shaft and a third shift arm on said second shift rod;
- a first operating mechanism for operating said first and second shift arms in response to movement of said speed change lever in said first direction;
- a speed operating mechanism for operating said third shift arm in response to movement of said speed change lever in said second direction;
- an input shaft rotatably coupled to said main shaft;
- a lubricating gear on said input shaft; and
- a lubricating gear rotatably mounted on sub-shaft and engaged with said lubricating gear on said input shaft.

16. A multiple stage speed change gear device comprising:
- an input shaft;
- a main shaft;
- a main speed change gear means providing a plurality of selectable different main gear ratios;
- a sub-speed change gear means providing selectable high and low speed gear ratios, said main speed and sub-speed change gear means being selectively engagable to rotatably couple said main shaft to said input shaft;
- a pivotable speed change lever;
- a first operating mechanism responsive to movement of said lever in a first direction to sequentially provide said different gear ratios, each at a different main position of said lever;
- a second operating mechanism responsive to movement of said lever in orthogonally related directions from each of said main positions to sequentially provide said high and low speed gear ratios; and
- a first lubricating gear on said input shaft and a second lubricating gear rotatably mounted on said sub-speed shaft and engaged with said first lubricating gear.

* * * * *